United States Patent
Anand

(10) Patent No.: US 11,877,237 B2
(45) Date of Patent: Jan. 16, 2024

(54) SYSTEM AND METHOD FOR OPTIMIZING POWER CONSUMPTION IN MULTIMEDIA SIGNAL PROCESSING IN MOBILE DEVICES

(71) Applicant: TriSpace Technologies (OPC) Pvt. Ltd., Bangalore (IN)

(72) Inventor: Narasimhan Vijay Anand, Bangalore (IN)

(73) Assignee: TriSpace Technologies (OPC) Pvt. Ltd., Bangalore (IN)

( * ) Notice: Subject to any disclaimer, the term of this patent is extended or adjusted under 35 U.S.C. 154(b) by 479 days.

(21) Appl. No.: 17/340,465

(22) Filed: Jun. 7, 2021

(65) Prior Publication Data

US 2021/0392577 A1    Dec. 16, 2021

(30) Foreign Application Priority Data

Jun. 15, 2020 (IN) .............................. 202041024982

(51) Int. Cl.
*H04W 52/02* (2009.01)
*G06F 9/30* (2018.01)
(Continued)

(52) U.S. Cl.
CPC .... *H04W 52/0209* (2013.01); *G06F 9/30032* (2013.01); *H04N 19/42* (2014.11);
(Continued)

(58) Field of Classification Search
CPC ........ H04N 19/42; H04N 19/85; H04N 19/44; G06F 9/30032; G10L 21/0208
See application file for complete search history.

(56) References Cited

U.S. PATENT DOCUMENTS

2020/0027202 A1*  1/2020  Oh ............................ G06T 1/20
2021/0329272 A1* 10/2021  Rusanovskyy ...... H04N 19/117

FOREIGN PATENT DOCUMENTS

CN          102598723 B    7/2015

OTHER PUBLICATIONS

First Examination Report issued in corresponding foreign application IN 202041024982 dated Oct. 12, 2020, 6 pages.
(Continued)

*Primary Examiner* — Girumsew Wendmagegn
(74) *Attorney, Agent, or Firm* — J. Peter Paredes; Amin Talati Wasserman LLP

(57) ABSTRACT

The present invention provides a system and method for optimizing power consumption in Multimedia Signal Processing in mobile devices. The system comprises a Media (speech, audio, image, and video) codec encoder module, a Media codec decoder module (106) and pre-processing and postprocessing (filtering, deblocking filter, Analytics, person detect, keyword/keyframe spotting) modules modules. The pre-processing and post-processing modules are implemented on a DSPNLIW processor, while the Media encoder and decoder modules are implemented on a CPU with SIMD extensions. This pipeline (asynchronous RPC, non-blocking) implementation of modules in multi-core reduces current consumption in the SoC by up to 50 percent compared to an implementation of the modules in a multiple CPU/DSP/VLIW core with synchronous RPC (blocking). The significant reduction in current consumption of the modules enables reduction of power consumption in the Multimedia processing use case. Thus, the invention provides a simple method of optimizing power consumption by multi core implementation of the modules in real world use case using Multimedia Signal Processing in mobile devices.

8 Claims, 3 Drawing Sheets

(51) Int. Cl.
*H04N 19/85* (2014.01)
*H04N 19/42* (2014.01)
*G10L 21/0208* (2013.01)
*H04N 19/44* (2014.01)

(52) U.S. Cl.
CPC .......... *H04N 19/85* (2014.11); *G10L 21/0208* (2013.01); *H04N 19/44* (2014.11)

(56) References Cited

OTHER PUBLICATIONS

Hearing Notice issued in corresponding foreign application IN 202041024982 issued Jan. 1, 2021, 3 pages.
Hearing Adjournment Notice issued in corresponding foreign application IN 202041024982 issued Apr. 8, 2021, 2 pages.
Ibrahim, Ya et al., "Preprocessing Technique in Automatic Speech Recognition for Human Computer Interaction: An Overview," Annals. Computer Science Series. 15th Tome 1st Fasc.—2017, pp. 186-191.
Cox, R. et al. "On the Application of Multimedia Processing to Telecommunications".
Seo, S. "Energy-Efficient Computing for Mobile Signal Processing," The University of Michigan, 155 pages.
Kuulusa, M., DSP Processor Core-Based Wireless System Design, Tampere University of Technology, Publications 296, Aug. 18, 2000, 152 pages.
Karlsson, A., "Design of Energy-Efficient High-Performance ASIP-DSP Platforms," Linkoping Studies in Science and Technology Dissertations, No. 1772, Department of Electrical Engineering, Linkoping University, 2016, 368 pages.
Savla, V, "DSP Architectures for System Design," M.Tech. Credit Seminar Report, Electronics Systems Group, EE Dept, IIT Bombay, Nov. 2002, 16 pages.

\* cited by examiner

SYSTEM AND METHOD FOR OPTIMIZING POWER CONSUMPTION IN MULTIMEDIA SIGNAL PROCESSING IN MOBILE DEVICES

CROSS-REFERENCE TO RELATED APPLICATIONS

The present applications claims priority from Indian patent application serial no. 202041024982, filed Jun. 15, 2020, herein incorporated by reference in its entirety.

BACKGROUND

The present invention relates to a system and method for optimizing power consumption in mobile devices. More specifically, the present invention relates to optimizing power consumption in mobile devices by reducing current consumption in Multimedia Application use case by implementing Media (speech, audio, image and video) codecs on a Central Processing Unit (CPU) with Single Instruction Multiple Data (SIMD) extensions and pre/post processing modules including filters (deblocking filtering), person detect, keyword/keyframe detect, Analytics, Echo cancellation, noise reduction on a Digital Signal Processor (DSP) core/Very Long Instruction Word (VLIW) core in a pipelined manner between the CPU and DSP/VLIW core. The processing of modules between the CPU and DSP/VLIW core acts on block/frame of data by asynchronous Remote Procedure Call (RPC) mechanism (non-blocking mode)

Multimedia applications is fast becoming compute intensive with adoption of 5G technology which offers at the core high data rates which is typical of Multimedia signal processing involved in real world application. There are various small form factor devices which would be designed to embrace 5G technology such as mobiles, smartphone and other portable wireless devices. Multimedia application essentially contains compression/decompression followed by pre/post processing modules.

Multimedia Signal Processing involves encoding (compressing) and decoding (decompressing) of digital media (speech, audio, image, video) data. There are various compression standards for these digital media viz. Adaptive Multi rate (AMR)-NB, AMR-WB, Enhanced voice services (EVS) codec for Speech, mp3 and Advanced Audio Coding (AAC) for audio, Joint Photographic Expert Group (JPEG) for Image, video compression standards such as Moving Picture Expert Group (MPEG)-1, MPEG-2, MPEG-4, H.264, H.265, AV1, VP8, VP10 and many more upcoming standards. These codecs encode media signals by exploiting various redundancy and prediction techniques. The computational complexity of processing these modules takes lot of processing cycles, and hence consume lot of current while the Multimedia application is running in the battery driven gadget/device such as smartphone mobile.

The high loading of processor in Multimedia Signal processing causes lot of power consumption, as a result the battery life of device usage is drastically reduced in the Multimedia use case application.

Minimizing power consumption and/or improving the data rate and user experience in User Equipment (UE) devices is important for all wireless communications systems. UE devices are increasingly consuming higher amounts of power as they become more and more sophisticated. UE devices have an onboard battery with a limited capacity. Thus, there is a problem of getting the best possible user experience under the constraint of a limited battery.

The U.S. patent document U.S. Pat. No. 10,390,309 titled "System and method for optimizing power consumption in mobile devices" discloses a method and apparatus for optimizing power consumption in mobile devices by suitable Instruction Set Architectural feature changes and optimal implementation of speech codecs. However, the solution is aimed at primary targeting the voice call use case.

Hence, there exists a need for system and method to optimize power consumption in mobile devices for optimizing power consumption in Multimedia application involving not only speech but other media such as audio, image, video for various real-world use cases using these media.

The present invention attempts to solve these problems, as well as others.

SUMMARY OF THE INVENTION

The present invention overcomes the drawbacks in the prior art and provides a system and method for optimizing power consumption in multimedia application in mobile devices. Many real-world use cases that solve myriad of problem statements uses multimedia signal processing at the core of it including encoder/decoder and pre/post processing such as analytics, person detect/recognition, speaker recognition, keyword/keyframe spotting. We propose a power efficient solution for these use cases.

The system comprises a sensor (mic/camera) integrated with the mobile device. The sensor captures input media and converts into digital media of different resolution viz. sampling frequency, sample resolution and media frame dimension.

In an embodiment of the invention, digital media signal is encoded according to compression standards including but not limited to MPEG-1, MPEG-15 2, MPEG-4, H.264, H.265, AV1, VP8, VP10 standard video codecs, AMR-NB, AMR-WB, EVS speech codecs, mp3, AAC audio codecs, JPEG image codecs or any other suitable standard for application. The various compression tools/algorithms are implemented in a CPU with instruction set having SIMD extension but without critical single cycle instruction Multiply and Accumulate (MAC). The preprocessing modules including, but not limited to, deblocking filter, echo cancellation, noise reduction, analytics, person detect/recognition, keyword/keyframe spotting, speaker recognition is implemented on a DSP. The current consumption in the System-On-Chip (SoC) is lowered by implementing the pre-processing on a DSP/VLIW core in the SoC while the media codec is implemented in CPU with SIMD extensions. The encoded signal is then transmitted over network.

The system also includes media codec decoder module disposed at the receiving end. The media codec decoder module is configured to decompress/decode the received compressed video signal from the network. The decoded media signal is then post processed. The post-processing includes, but not limited to, deblocking filter, echo cancellation, noise reduction, analytics, person detect/recognition, keyword/keyframe spotting, speaker recognition. The post processing modules are implemented in a DSP/VLIW core while the video codec decoder is implemented in CPU with SIMD extensions.

The processing of modules in pipelined between the CPU and DSP/VLIW via asynchronous RPC (non-blocking mode) at block/frame level of media data.

Thus, the present invention also provides method to improve the power consumption in a multimedia application in mobile devices. The present method yields up to 50 percent savings in current consumption in a multimedia application compared to an implementation of media codecs on CPU with SIMD extensions and pre/post processing modules on digital signal processor (DSP)/very long instruction word (VLIW) processor with synchronous RPC mechanism (blocking mode) The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

BRIEF DESCRIPTION OF THE DRAWINGS

The foregoing and other features of embodiments will become more apparent from the following detailed description of embodiments when read in conjunction with the accompanying drawings. In the drawings, like reference numerals refer to like elements.

DETAILED DESCRIPTION OF THE INVENTION

Figure 1:
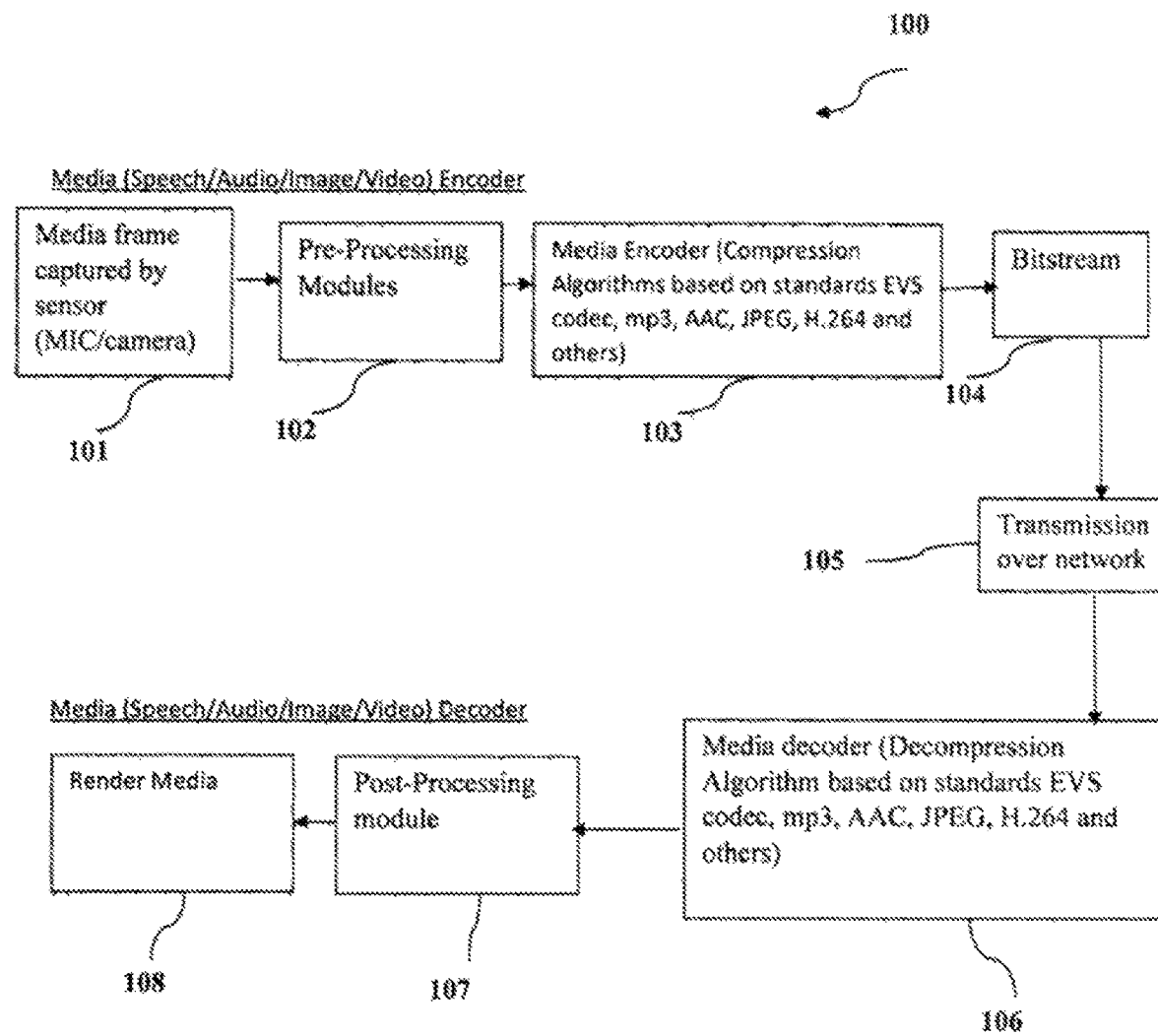
FIG. 1 illustrates a block diagram of a system for optimizing power consumption in multimedia application in mobile devices, according to one embodiment of the invention.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

In order to more clearly and concisely describe and point out the subject matter of the claimed invention, the following definitions are provided for specific terms, which are used in the following written description.

The present invention provides a system and method for optimizing power consumption in multimedia application in mobile devices. The system comprises a mic/camera, a media codec encoder, a media codec decoder, media pre/post processing modules including, but not limited to, deblocking filter, echo cancellation, noise reduction, analytics, person detect/recognition, keyword/keyframe spotting, speaker recognition. The pipelined implementation of media codecs and pre/post-processing modules in CPU with SIIVID extension and DSP/VLIW respectively results in up-to 50 percent reduction of power consumption in the multimedia application use case compared to implementation of these modules in multiple CPU and DSP/VLIW processor with blocking (synchronous) RPC mechanism.

FIG. 1 illustrates a block diagram of a system for optimizing power consumption in multimedia signal processing in mobile devices, according to one embodiment of the invention. In a preferred embodiment, the system comprises a mic/camera (101) which is integrated with a mobile device. The mic/camera (101) is configured to receive input media and feeds media frame samples to media pre-processing module (102). The processed media samples are then passed to media codec module (103). The media samples are encoded using the coding tools described in the media codec standard (104).

At the transmitting end, the media frame samples are fed to a media codec encoder module (102). The media codec encoder module is configured to compress/encode the media signal running on a processor, a CPU with SIMD extensions. The processing of media frames is pipelined between the CPU and DSP/VLIW, pre-processed modules are implemented on DSP/VLIW core. The current consumption in the SoC is reduced up to 50 percent in the transmission path (102, 103, 104) compared to an implementation of the modules on CPU and DSP/VLIW core with synchronous RPC (blocking mode). The encoded signals are then transmitted over a transmission network (105).

Further, a media codec decoder module (106) is present at receiving end. The media codec decoder module (106) is configured to decompress/decode the received compressed media signals (running on a CPU with SIMD extension). The decoded media samples are then post processed. The post processing modules (107) is implemented in a DSP/VLIW processor. This pipelined implementation 15 (asynchronous RPC between CPU and DSP/VLIW processor at block/frame level of media samples) results in reduced current consumption (up to 50 percent) by the mobile device.

Figure 2:
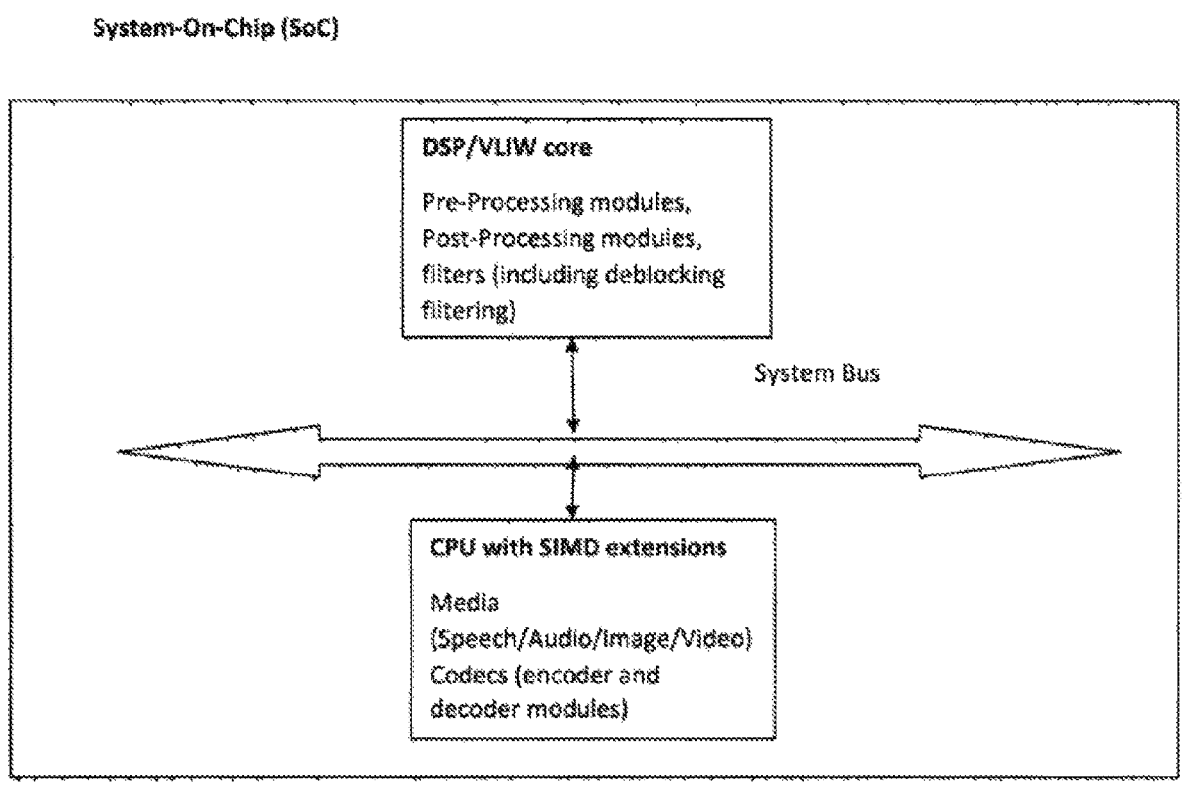
FIG. 2 illustrates method for optimizing power consumption in mobile devices, according to one embodiment of the invention.
Figure 3:
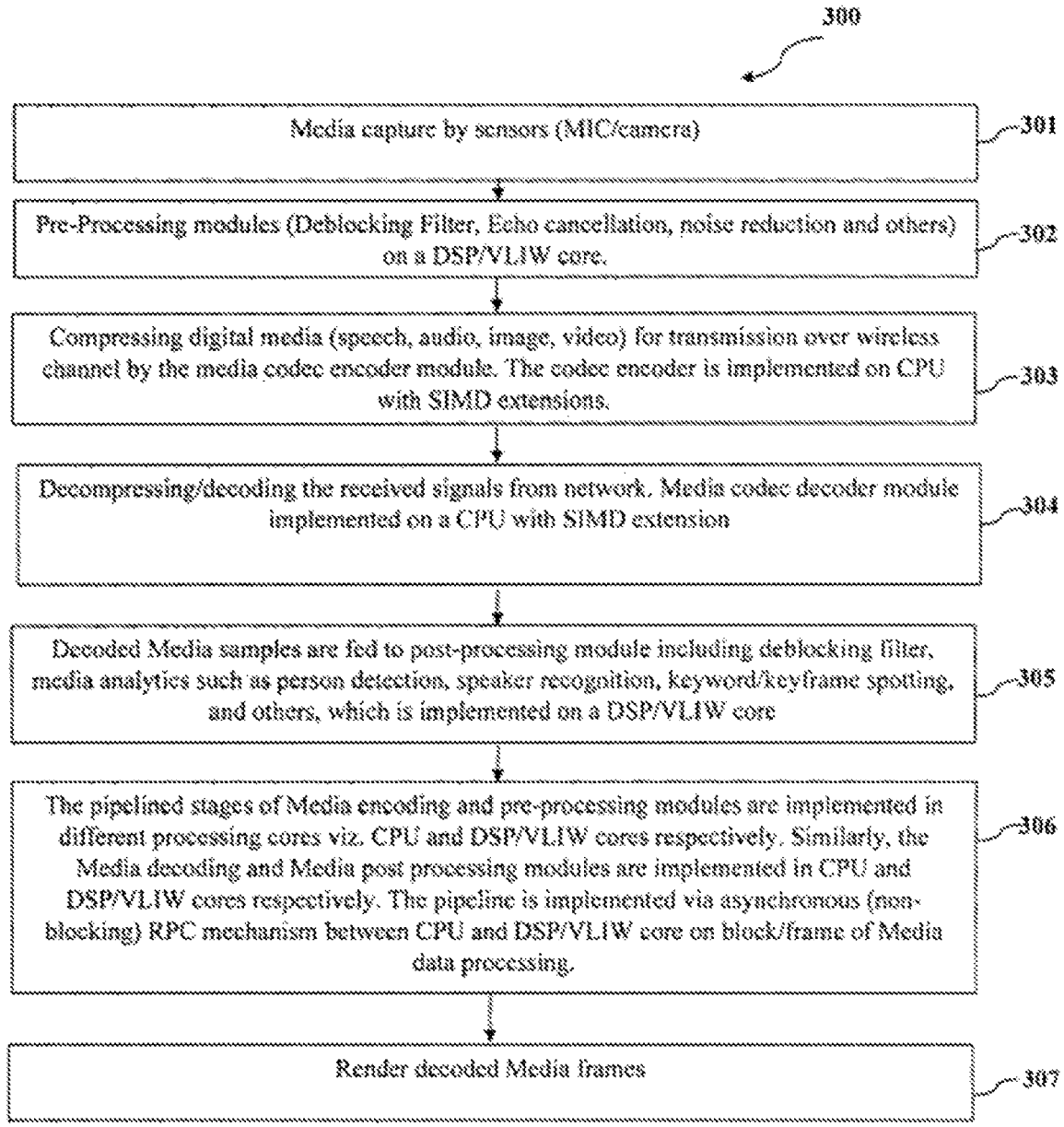
FIG. 3 illustrates method for optimizing power consumption in mobile devices, according to one embodiment of the invention.

FIG. 2 is an embodiment of the invention, the pipelined implementation of media codec and post-processing modules on different processing cores CPU and DSP/VLIW core respectively results in reducing current consumption by up to 50 percent (102, 103, 104, and 106, 107). The Architecture of the SoC contains DSP/VLIW and a CPU with SIMD extensions. Thus, low power multimedia signal processing is achieved using the present invention FIG. 3 illustrates the method for optimizing power consumption in 25 multimedia application in mobile devices, according to one embodiment of the invention. In a preferred embodiment, the method initiates with the step of receiving and recording raw media at step 301.

At step 302, the preprocessing is implemented on DSP/VLIW core. Media frame samples are compressed/encoded by a media codec encoder module 303. The media encoder is implemented on CPU with SIMD extensions. The current consumption in multimedia application is reduced by up to 50 percent by this multicore implementation (102, 103, 104). The encoded signals are transmitted via network (105).

At step 304, the compressed media signal is received from the network. Wherein they are decompressed/decoded by the media codec decoder (106).

At step 305, decoded media is post-processed to get output media frame (107). The post processed video frame samples are then rendered (108).

The inventive step in multimedia application use case in the SoC with media encoder/decoder module implemented on CPU with SIMD extensions is described now. Usually the multimedia application is implemented in CPU with compute intensive modules offloaded to DSP/VLIW via synchronous RPC (blocking mode). The CPU is busy waiting while DSP processes. By implementing encoder/decoder part of the multimedia application in the CPU and pre/post processing modules on DSP/VLIW processor via asynchronous (non-blocking) RPC mechanism, gives power savings.

Thus, the present invention provides a method to improve the power consumption in a multimedia application in mobile device. The less power consumption, thereby reduces thermal aspect and extends battery life of mobile device.

System

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos.

In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

All publications and patent applications mentioned in this specification are herein incorporated by reference to the same extent as if each individual publication or patent application was specifically and individually indicated to be incorporated by reference.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A system (100) for optimizing power consumption in Multimedia Signal Processing in mobile devices, the system (100) comprising:
   a. a sensor (Mic/camera) (101) integrated in the mobile device to capture the media (speech, audio, image, video) of different resolution (sampling frequency, sample resolution in bits, frame dimensions);
   b. Pre-processing modules including, but not limited to, deblocking filter, echo cancellation, noise reduction, analytics, person detect/recognition, keyword/keyframe spotting, speaker recognition (102), wherein the Pre-processing module (102) is implemented in a DSP/VLIW processor;
   c. a Media codec encoder module (103) configured to compress/encode media signals for efficient transmission over wireless channels, wherein the implementation is performed on a CPU with SIMD extensions, wherein the encoded signals are transmitted via network (105);
   d. a Media codec decoder module (106) configured to decompress/decode the received compressed Media signal from network (105), wherein the Media codec decoder is implemented on a CPU with SIMD extensions, wherein the Media codec decoder module (106) is present at receiving end;
   e. Post-processing modules including, but not limited to deblocking filter, noise reduction, Analytics, person detect/recognition, keyword spotting/recognition, speaker recognition, (107), wherein the decoded Media samples are processed on a DSP/VLIW core;
   f. the SoC is designed to have CPU with SIMD extensions and DSP/VLIW processing core to have pipelined implementation of the Multimedia Signal Processing modules between the two cores; where in the Arithmetic Logic Unit (ALU) of CPU is designed without saturation in the critical instructions, wherein the critical instruction include but not limited to Multiply and Accumulate (MAC) and shift instructions;
   g. the pipelined implementation between the CPU and DSP/VLIW core is via asynchronous RPC (non-blocking) mechanism acting at block or frame level of media data; and
   h. a Media renderer (108) configured to render media frame samples from post-processing module (107).

2. The system as claimed in claim 1, wherein the media codec module (103, 106) includes, but not limited to, MPEG-1, MPEG-2, MPEG-4, H.264, H.265, AV1, VP8, VP10 standard video codecs, AMR-NB, AMR-WB, EVS speech codecs, mp3, AAC audio codecs, JPEG image codecs.

3. The system as claimed in claim 1, wherein the mobile device includes portable cell phone, mobile handset, mobile phone, wireless phone, cellular phone, portable phone, a personal digital assistant (PDA), and smartphones.

4. The system as claimed in claim 1, wherein the optimizing power consumption is applicable in Multimedia Signal processing in playback and record with no transmission.

5. The system as claimed in claim 1, wherein the current consumption is reduced by up to 50 percent in Multimedia signal processing compared to implementation of all the modules (media codec encoder, media codec decoder, pre-processing and Post-processing) on a CPU and DSP/VLIW processor in the SoC with synchronous RPC (blocking mode) between the CPU and DSP/VLIW processor.

6. A method for optimizing power consumption in mobile devices, the method comprising the steps of:
   a. a sensor (Mic/camera) (101) integrated in the mobile device to capture the media (speech, audio, image, video) of different resolution (sampling frequency, sample resolution in bits, frame dimensions);

b. Pre-processing modules including, but not limited to, deblocking filter, echo cancellation, noise reduction, analytics, person detect/recognition, keyword/key-frame spotting, speaker recognition (102), wherein the Pre-processing module (102) is implemented in a DSP/VLIW processor;

c. a Media codec encoder module (103) configured to compress/encode media signals for efficient transmission over wireless channels, wherein the implementation is performed on a CPU with SIMD extensions, wherein the encoded signals are transmitted via network (105);

d. a Media codec decoder module (106) configured to decompress/decode the received compressed Media signal from network (105), wherein the Media codec decoder is implemented on a CPU with SIMD extensions, wherein the Media codec decoder module (106) is present at receiving end;

e. Post-processing modules including, but not limited to deblocking filter, noise reduction, Analytics, person detect/recognition, keyword spotting/recognition, speaker recognition, (107), wherein the decoded Media samples are processed on a DSP/VLIW core;

f. the SoC is designed to have CPU with SIMD extensions and DSP/VLIW processing core to have pipelined implementation of the Multimedia Signal Processing modules between the two cores; where in the Arithmetic Logic Unit (ALU) of CPU is designed without saturation in the critical instructions, wherein the critical instruction include but not limited to Multiply and Accumulate (MAC) and shift instructions;

g. the pipelined implementation between the CPU and DSPNLIW core is via asynchronous RPC (non-blocking) mechanism acting at block or frame level of media data; and h. a Media renderer (108) configured to render media frame samples from post-processing module (107).

7. The method as claimed in claim 6, wherein the media codec modules (103, 106) includes, but not limited to, MPEG-1, MPEG-2, MPEG-4, H.264, H.265, AV1, VP8, VP10 standard video codecs, AMR-NB, AMR-WB, EVS speech codecs, mp3, AAC audio codecs, JPEG image codecs.

8. The method as claimed in claim 7, wherein the mobile device includes portable cell phone, mobile handset, mobile phone, wireless phone, cellular phone, portable phone, a personal digital assistant (PDA) and smartphones.

* * * * *